(12) United States Patent  
Kawaoka (10) Patent No.: US 7,538,899 B2  
(45) Date of Patent: May 26, 2009

(54) PRINT TERMINAL APPARATUS

(75) Inventor: Yoshiki Kawaoka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1140 days.

(21) Appl. No.: 10/330,292

(22) Filed: Dec. 30, 2002

(65) Prior Publication Data

US 2003/0129970 A1 Jul. 10, 2003

(30) Foreign Application Priority Data

Jan. 8, 2002 (JP) ............................. 2002-001128

(51) Int. Cl.
- *H04N 1/00* (2006.01)
- *H04N 1/40* (2006.01)
- *G06F 3/12* (2006.01)
- *G06K 15/00* (2006.01)

(52) U.S. Cl. .................... 358/1.15; 358/407; 358/1.16; 358/462

(58) Field of Classification Search .............. 358/1.15, 358/407, 1.16, 462
See application file for complete search history.

(56) References Cited

U.S. PATENT DOCUMENTS

| 6,721,784 | B1 * | 4/2004 | Leonard et al. | 709/206 |
|---|---|---|---|---|
| 6,801,935 | B2 * | 10/2004 | Shen | 709/219 |
| 6,819,446 | B1 * | 11/2004 | Ogawa et al. | 358/1.15 |
| 7,057,757 | B2 * | 6/2006 | Yamaguchi | 358/1.15 |
| 7,058,594 | B2 * | 6/2006 | Stewart | 705/14 |
| 2001/0047389 | A1 * | 11/2001 | Prahlad et al. | 709/206 |
| 2002/0012424 | A1 * | 1/2002 | Nishio et al. | 379/100.06 |
| 2002/0157028 | A1 * | 10/2002 | Koue et al. | 713/202 |
| 2002/0191211 | A1 * | 12/2002 | Miller et al. | 358/1.15 |
| 2003/0067624 | A1 * | 4/2003 | Anderson et al. | 358/1.15 |
| 2003/0095281 | A1 * | 5/2003 | Parry | 358/1.15 |
| 2006/0183467 | A1 * | 8/2006 | Stewart | 455/414.3 |

FOREIGN PATENT DOCUMENTS

| JP | 11-355498 | 12/1999 |
|---|---|---|
| JP | 2001-333450 | 11/2001 |

* cited by examiner

*Primary Examiner*—Houshang Safaipour  
(74) *Attorney, Agent, or Firm*—Sughrue Mion, PLLC (57) ABSTRACT

The print terminal apparatus can print an image exchanged via an electronic mail without preparing any printer personally. In printing an image attached to the electronic mail that a user received in the past, identification information of the user such as a portable telephone number (mail address) of the user is firstly input on a monitor with a touch panel for a print terminal apparatus installed in a shop front. The print terminal apparatus retrieves the image attached to the electronic mail addressed to the user from a mail server via a communication line interface into a storage on the basis of this identification information of the user, and displays a list of images on the monitor with the touch panel. If the image to be printed is selected on this monitor, and a charged amount of cash is thrown into a coin machine, a selected image is printed by a print engine.

20 Claims, 6 Drawing Sheets

PRINT TERMINAL APPARATUS

BACKGROUND OF THE INVENTION

1. Field of the Invention

The present invention relates to a print terminal apparatus, and more particularly to a print terminal apparatus for printing an image exchanged between portable telephones with a digital camera in a shop front.

2. Description of the Related Art

In recent years, the portable telephones with digital camera (DSC) have been spread. This portable telephone with DSC employs an electronic mail function to attach an image photographed by the portable telephone with DSC to an electronic mail and deliver the electronic mail with the image attached to a certain mail server in charge of an electronic mail address of a transmission destination.

A recipient of electronic mail receives a mail, and makes access to the mail server to confirm the contents of the mail. In this case, if there is an image file as an attached file, the attached file is opened to read the image information, and the image is displayed on a liquid crystal monitor of the portable telephone to confirm the image.

Japanese Patent Application Publication No. 2001-333450 discloses a system in which an electronic mail with image is received by a portable terminal such as PDA having the electronic mail function and written into a memory card detachable within the portable terminal, and this memory card is loaded into a printer within a customer to print the image.

Japanese Patent Application Publication No. 11-355498 discloses another system in which a connection destination information (URL) for the contents to be printed is only sent from a portable information terminal to the print terminal, and the print terminal makes connection to a corresponding WWW server, using the URL, acquires the necessary information from this WWW server and prints the contents.

Conventionally, an image exchanged between friends using the portable telephone with DSC was stored in a memory within the portable telephone, but to print this image, there was only a method in which a small printer for the portable telephone is prepared personally, the image data is transferred from the portable telephone to the small printer, or the image data is transferred from the portable telephone to the personal computer and output from the personal computer to the printer connected to the personal computer.

SUMMARY OF THE INVENTION

The present invention has been achieved in the light of the above-mentioned circumstances, and it is an object of the invention to provide a print terminal apparatus that can print an image exchanged via an electronic mail without preparing any printer personally.

In order to attain the above object, the present invention is directed to a print terminal apparatus, comprising: a communication device which communicates with a server that stores an electronic mail with an image attached; an input device which inputs the identification information of a user, and a selection of an image to be printed; an image retrieving device which retrieves the image attached to the electronic mail addressed to the user from the server via the communication device on the basis of the identification information of the user input by the input device; a display device which displays a list of the retrieved images; and a printing device which prints a selected image if a selection instruction for selecting the image to be printed from the list of images displayed on the display device is input by the input device.

That is, in printing the image attached to the electronic mail which the user received in the past, the identification information of the user is firstly input by the input device of the print terminal apparatus installed in the shop front. This identification information of the user may be a combination of portable telephone number, mail address and personal identification number.

If the identification information of the user is input, the image retrieving device retrieves the image attached to the electronic mail addressed to the user from the server via the communication device. The server stores the electronic mail with the image attached for a predetermined period. If there is a request for the image from the print terminal apparatus, the electronic mail with image file attached is selected from among the electronic mails addressed to the relevant user on the basis of the identification information of the user, and the image file of the selected electronic mail is sent out. Irrespective of whether or not the electronic mail has the image file attached from the server, the electronic mail addressed to the user stored at present may be transmitted in accordance with the identification information of the user, and the electronic mail with image file may be selected on the print terminal apparatus to retrieve the image file of the selected electronic mail.

A list of retrieved images is displayed on the display device, and an image to be printed is selected from the list of images displayed by the input device. And if the image to be printed is selected, the image selected by the printing device is printed. The number of prints may be arbitrarily set by the input device, although the default number of prints is one.

In order to attain the above object, the present invention is also directed to a print terminal apparatus, comprising: a communication device which communicates with a server that stores an electronic mail with an image attached; an input device which inputs the identification information of a user; an image retrieving device which retrieves the image with a print request flag set beforehand and attached to the electronic mail addressed to the user from the server via the communication device on the basis of the identification information of the user input by the input device; and a printing device which prints the retrieved image.

In the first aspect of the present invention, the image to be printed is selected from the list of images displayed on the display device. However, in the second aspect of the present invention, the image to be printed is selected beforehand on the monitor screen of the portable telephone, and notified to the server to set up the print request flag in the electronic mail having the selected image to be printed. And if the identification information of the user is input, the image retrieving device retrieves the image attached to the electronic mail addressed to the user and having the print request flag set from the server via the communication device. The image retrieved in this manner is printed by the printing device.

In order to attain the above object, the present invention is also directed to a print terminal apparatus, comprising: a communication device which communicates with a server that stores an electronic mail with an image attached; an input device which inputs the identification information of a user; an image retrieving device which retrieves the image attached to the electronic mail which the user transmits at a predetermined address of the print terminal apparatus via the communication device from the server on the basis of the identification information of the user input by the input device and the predetermined address of the print terminal apparatus; and a printing device which prints the retrieved image.

That is, the image to be printed is confirmed on the portable telephone of the user, and the electronic mail with image file, which is provided with the predetermined address (e.g., designated address of the print terminal apparatus) as the transmission destination, is sent to the server. And if the identification information of the user is input, the image retrieving device retrieves the image attached to the electronic mail which the user transmits to the predetermined address from the server. The image retrieved in this manner is printed by the printing device. In the present invention, the image retrieved from the server may be once displayed on the display device, and printed upon accepting an instruction for final confirmation of the image to be printed.

Preferably, the printing device may print the characters of the electronic mail along with the image. Namely, the character information of the electronic mail with image is retrieved from the server, and the characters of the electronic mail are printed along with the image.

Preferably, the print terminal apparatus may further comprise a billing device for billing a print output by the printing device. The billing device may involve the payment of cash with the coin machine, adding to the telephone charge of the portable telephone, or a credit card or a prepaid card. The printing device prints the image, provided that the charging is possible with the billing device, whereby the charging is made after printing.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The preferred embodiments of a print terminal apparatus according to the present invention will be described below with reference to the accompanying drawings.

Figure 1:
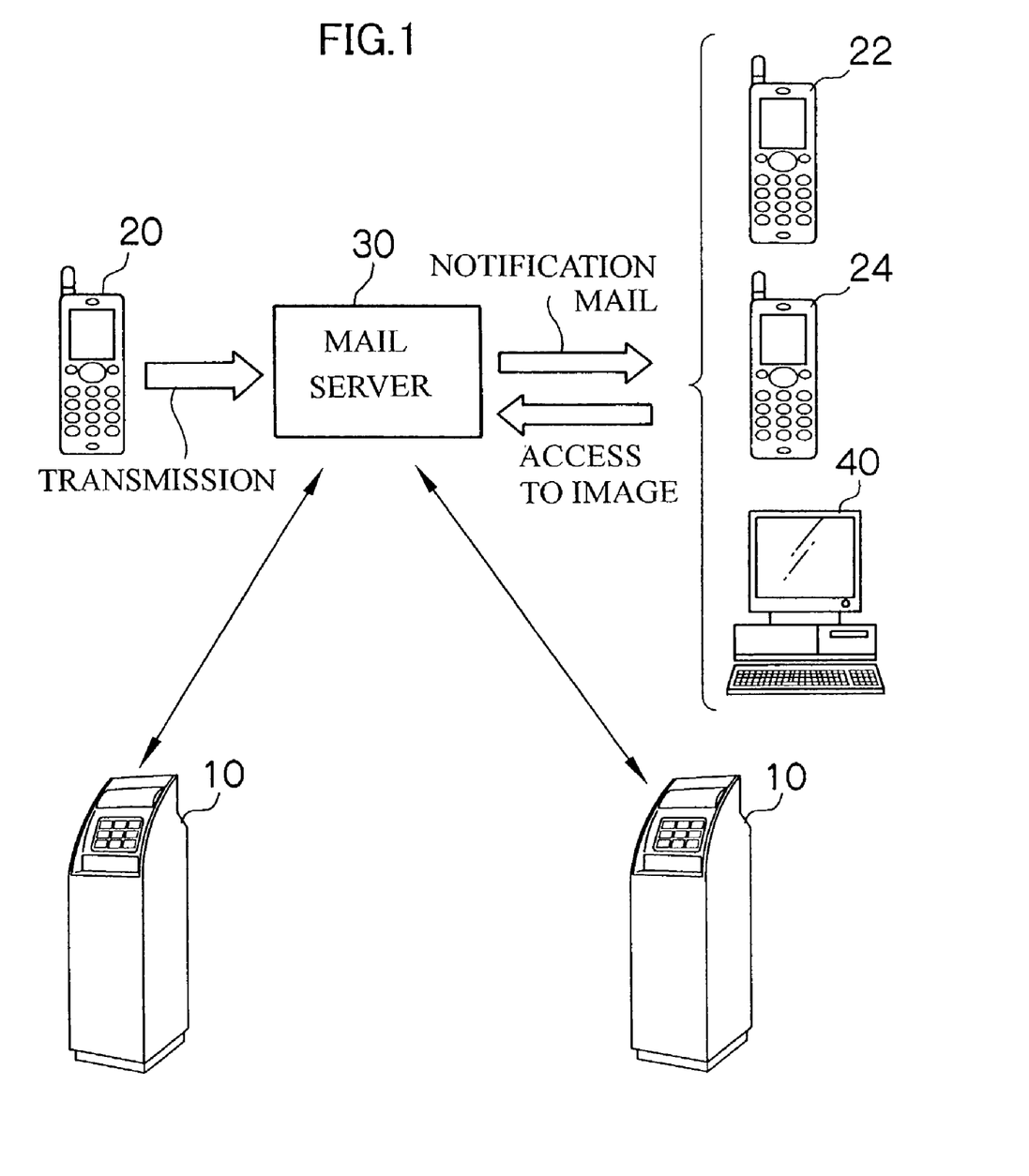
FIG. 1 is a schematic diagram showing an image print system including a print terminal apparatus according to the present invention.

FIG. 1 is a schematic diagram of an image print system comprising the print terminal apparatus according to the invention.

As shown in FIG. 1, this system comprises print terminal apparatuses 10, 10, . . . installed at a shop front, portable telephones with DSC 20, 22, 24, . . . having an electronic mail function, a mail server 30, and a personal computer 40 having an electronic mail function. The print terminal apparatus 10, the portable telephones with DSC 20, 22, 24, the mail server 30 and the personal computer 40 are interconnected through a network, not shown.

The print terminal apparatus 10 receives an image file attached to an electronic mail principally from the mail server 30, and prints an image. The details of the print terminal apparatus 10 will be described later.

Each of the portable telephone with DSC 20, 22 and 24 has a photography function of photographing an image with a digital camera, a transmitting and receiving function of electronic mails (including an electronic mail with an image file attached), a liquid crystal monitor for displaying the image, and a memory for storing the image data.

The mail server 30 has a transmitting and receiving function of electronic mails, a mailbox function, and an electronic mail management function.

In the case where an image is transmitted from the portable telephone with DSC 20 to the portable telephone with DSC 22, 24 or the personal computer 40, a subject is photographed, employing the portable telephone with DSC 20, and the image is taken into the portable telephone. The image may be taken into the portable telephone via an external interface.

The image taken into the portable telephone is transmitted along with the transmission destination information such as a mail address, a mail account and a mail password of the portable telephone with DSC 22, 24 or the personal computer 40 as the transmission destination, using the electronic mail (with attachment of the file) function of the portable telephone.

The transmitted electronic mail with the image file attached is stored in a mailbox assigned for each mail account of the electronic mail on a hard disk of the mail server 30, and the mail server 30 notifies the corresponding user that the electronic mail has reached. The user of the portable telephone with DSC 22, 24 or the personal computer 40 can make access to the mail server 30 to download an electronic mail addressed to the user and read the contents of the electronic mail.

In the case where there is an image file as a file attached to the electronic mail, the image file is opened to read the image information, and its image is displayed and confirmed on a monitor of the portable telephone with DSC 22, 24 or the personal computer 40. The received electronic mail is memorized in the memory of the portable telephone with DSC 22, 24 or the personal computer 40.

In this manner, it is possible to exchange the image between friends, employing the electronic mail.

The print terminal apparatus 10 according to the invention will be described below.

Figure 2:
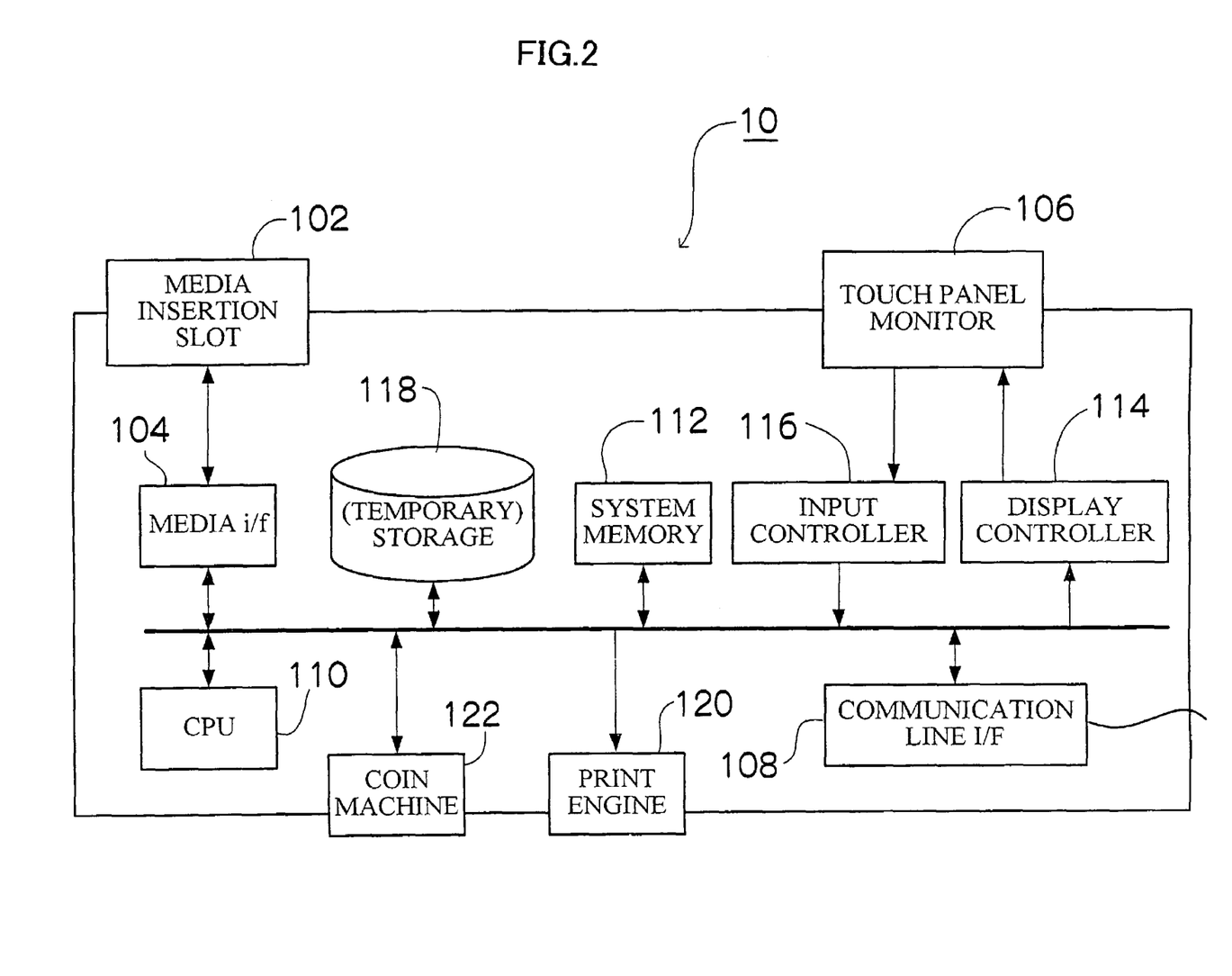
FIG. 2 is a block diagram showing an embodiment of the print terminal apparatus according to the invention.

FIG. 2 is a block diagram showing an embodiment of the print terminal apparatus 10. As shown in FIG. 2, the print terminal apparatus 10 is provided with a media insertion slot 102 for inserting any of the recording media such as smart media, memory stick or compact flash, a media interface 104, a monitor with a touch panel 106, and a communication line interface 108 capable of transmitting or receiving the necessary information with the mail server 30.

The monitor with touch panel 106 displays the image recorded on the recording medium inserted into the media insertion slot 102, a list of images received from the mail server 30, or the operation buttons for operating the touch panel.

Also, the print terminal apparatus 10 is provided with a central processing unit (CPU) 110 for controlling the entire print terminal apparatus 10, a system memory 112 composed of a ROM storing the programs for operating the CPU 110 and a RAM as a working area when the CPU 110 performs the processing, a display controller 114 for controlling the information to be displayed on the monitor with touch panel 106, and an input controller 116 for inputting the user identification information such as the portable telephone number of the user, mail address and password, which is input by the user employing the monitor with touch panel 106, and the print setting information such as the selection of the image to be printed, and the number of prints (default number is one).

Also, the print terminal apparatus 10 is provided with a storage 118 for temporarily storing the image information taken in from the recording media inserted into the media insertion slot 102 or from the mail server 30 or the print setting information, a print engine 120 for printing the image stored in the storage 118 on the basis of the print setting information, and a coil machine 122.

The operation of an image print system including the print terminal apparatus 10 will be described below.

First Embodiment

Figure 3:
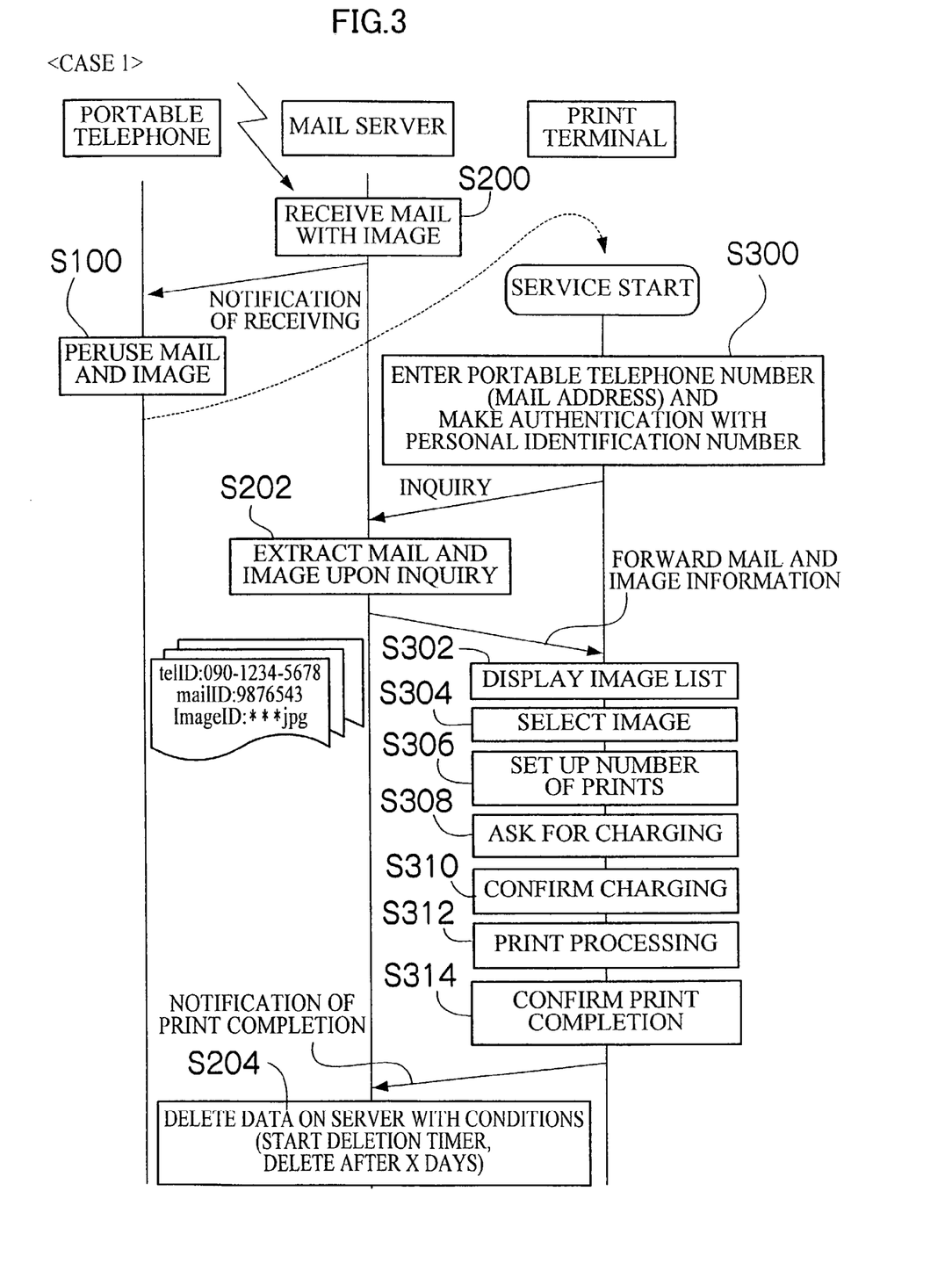
FIG. 3 is a flowchart showing a first embodiment of an operation of the image print system.

FIG. 3 is a flowchart showing a first embodiment of an operation of the image print system.

As previously described, the mail server 30 receives an electronic mail (electronic mail with image) (step S200), and notifies a destination user that the electronic mail is received. The user receiving this notification can make access to the mail server 30 to download the electronic mail addressed to the user and peruse the contents of the mail or the image (step S100).

On the other hand, when the image received by the electronic mail is printed on the print terminal apparatus 10, the user operates the touch panel of the print terminal apparatus 10 to enter the user identification information such as the portable telephone number (mail address) and the personal identification number (step S300).

The print terminal apparatus 10 makes an inquiry as to whether or not the electronic mail (electronic mail with image) addressed to the user is stored in the mailbox via the communication line interface 108 to the mail server 30 on the basis of the entered user identification number.

The mail server 30 stores the electronic mail in the mailbox for a predetermined period (e.g., several weeks), after transferring the electronic mail upon access from the portable telephone. If the electronic mail corresponding to the inquiry is stored, the electronic mail with image is extracted and all the extracted electronic mails with image are transferred to the print terminal apparatus 10 (step S202). The electronic mail with image may be acquired from the print terminal apparatus 10 by notifying the route of acquiring the file with image to the print terminal apparatus 10.

By the way, the file that can be attached to the electronic mail by the portable telephone is only an image file at present. Therefore, it is possible to determine whether or not the image is attached to the electronic mail from the portable telephone, on the basis of the presence or absence of the file attached. Also, it may be possible to determine whether or not the image file is attached on the basis of an extension of the file.

The print terminal apparatus 10 receives, from the mail server 30, all the electronic mails with image addressed to the user who inputs the user identification information in the above manner, a list of received images is displayed on the monitor with touch panel 106 (step S302).

The user selects an image to be printed from a list of images displayed on the monitor with touch panel 106 by touching on the touch panel (step S304). Also, the number of prints for each image is set up, employing the ten key on the touch panel (step S306). Since the default number of prints is one, an operation of setting up the number of prints is made only when the number of prints is set up at two or more.

If the selection of image and the number of prints are set up, the charge of prints is demanded (step S308). And if it is confirmed that the sum of money thrown into the coin machine 122 is more than or equal to the charged amount (step S310), the selected image is printed by the print engine 120 (step S312). Thereafter, if it is confirmed that printing all the images is completed (step S314), the amount is settled, the printed images are exhausted, and the print completion is notified to the mail server 30.

The mail server 30 receives the print completion, and deletes all the electronic mails with image transmitted to the print terminal apparatus 10, or the electronic mails with image corresponding to the printed images from the mailbox, even before the expiration of a storage period (step S204). The electronic mails with image may be deleted after a predetermined period (shorter than the ordinary storage period) in such a way that if the print completion is received, a deletion timer is started.

In the first embodiment, the mail server 30 selects the electronic mail with image. In addition, however, all the electronic mails stored in the mailbox for the user who desires for printing may be transmitted to the print terminal apparatus 10, and the electronic mails with image may be extracted on the side of the print terminal apparatus 10.

Second Embodiment

Figure 4:
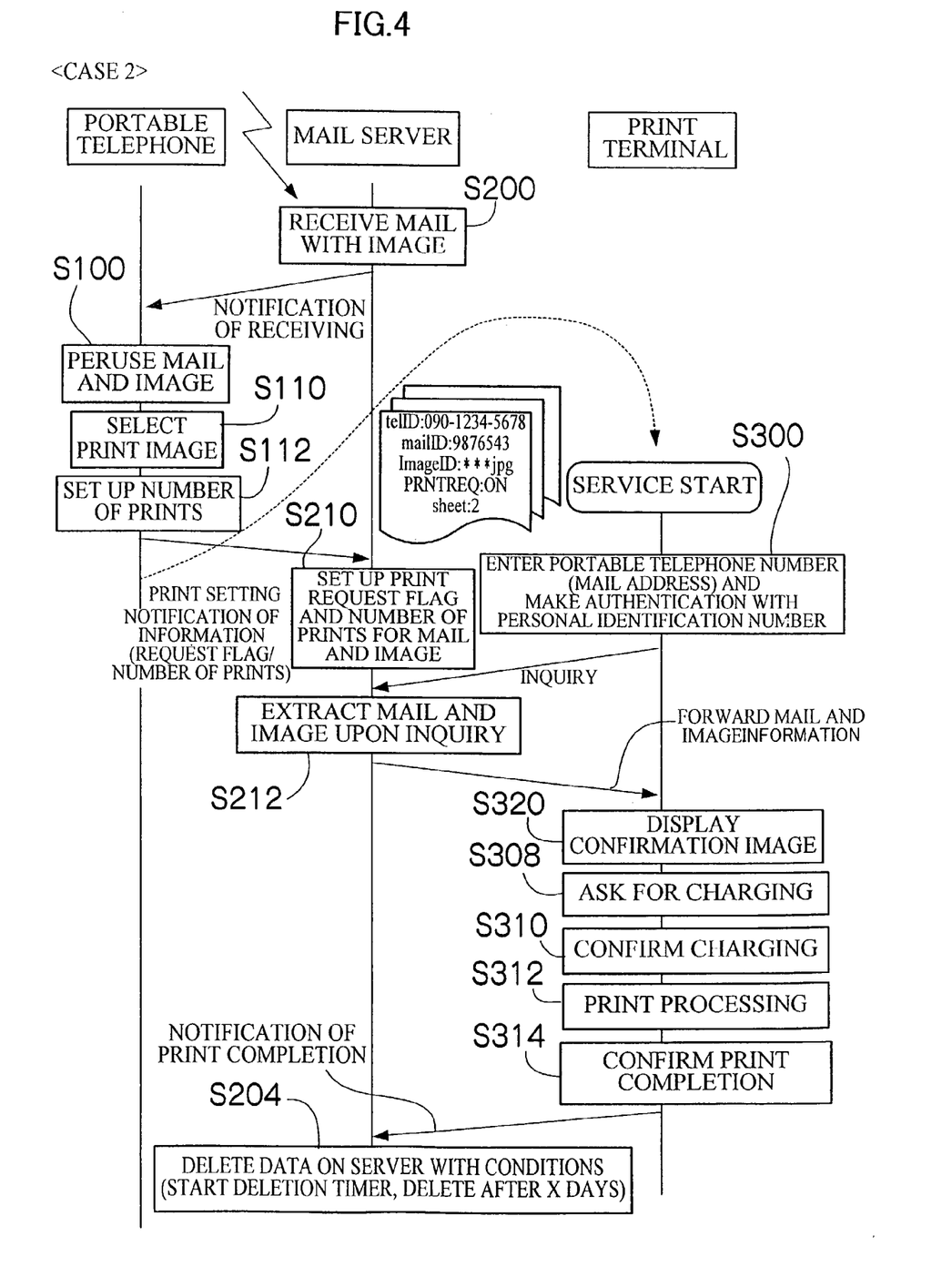
FIG. 4 is a flowchart showing a second embodiment of the operation of the image print system.

FIG. 4 is a flowchart showing a second embodiment of the operation of the image print system. The common steps to the first embodiment of FIG. 3 are designated by the same step numbers, and the described description of common steps is omitted.

The second embodiment is the same as the first embodiment, except that the selection of image to be printed and the number of prints are set up beforehand by the portable telephone.

That is, the image to be printed is selected by displaying the image memorized in the memory within the portable telephone on the monitor of the portable telephone (step S110). Also, the number of prints for the selected image is set up, employing the ten key of the portable telephone (step S112). If the selection of image and the number of prints are set up by the portable telephone in this manner, the print setting information is notified to the mail server 30.

The mail server 30 receives the print setting information, and sets up a print request flag and the number of prints for the corresponding electronic mail with image (step S210).

Thereafter, when the image selected beforehand by the portable telephone is printed, the user operates the touch panel of the print terminal apparatus 10 to enter the user identification information such as the portable telephone number (mail address) and personal identification number (step S300). And the print terminal apparatus 10 makes an inquiry of whether or not the electronic mail with image addressed to the user and having the print request flag set is stored in the mailbox via the communication line interface 108 to the mail server 30 on the basis of the user identification information entered.

The mail server 30 extracts the electronic mail with image addressed to the user and having the print request flag set on the basis of the user identification information, and transfers the extracted electronic mail with image to the print terminal apparatus 10 (step S212).

The print terminal apparatus 10 receives the electronic mail with image from the mail server 30, and displays the received image on the monitor with touch panel 106 for final confirmation (step S320). After the user touches a confirmation button on the monitor with touch panel 106, the same processing as in the first embodiment of FIG. 3 is performed.

When the user makes the final confirmation for the printed image, the selection of image and the number of prints may be made in the same manner as in the first embodiment.

Third Embodiment

Figure 5:
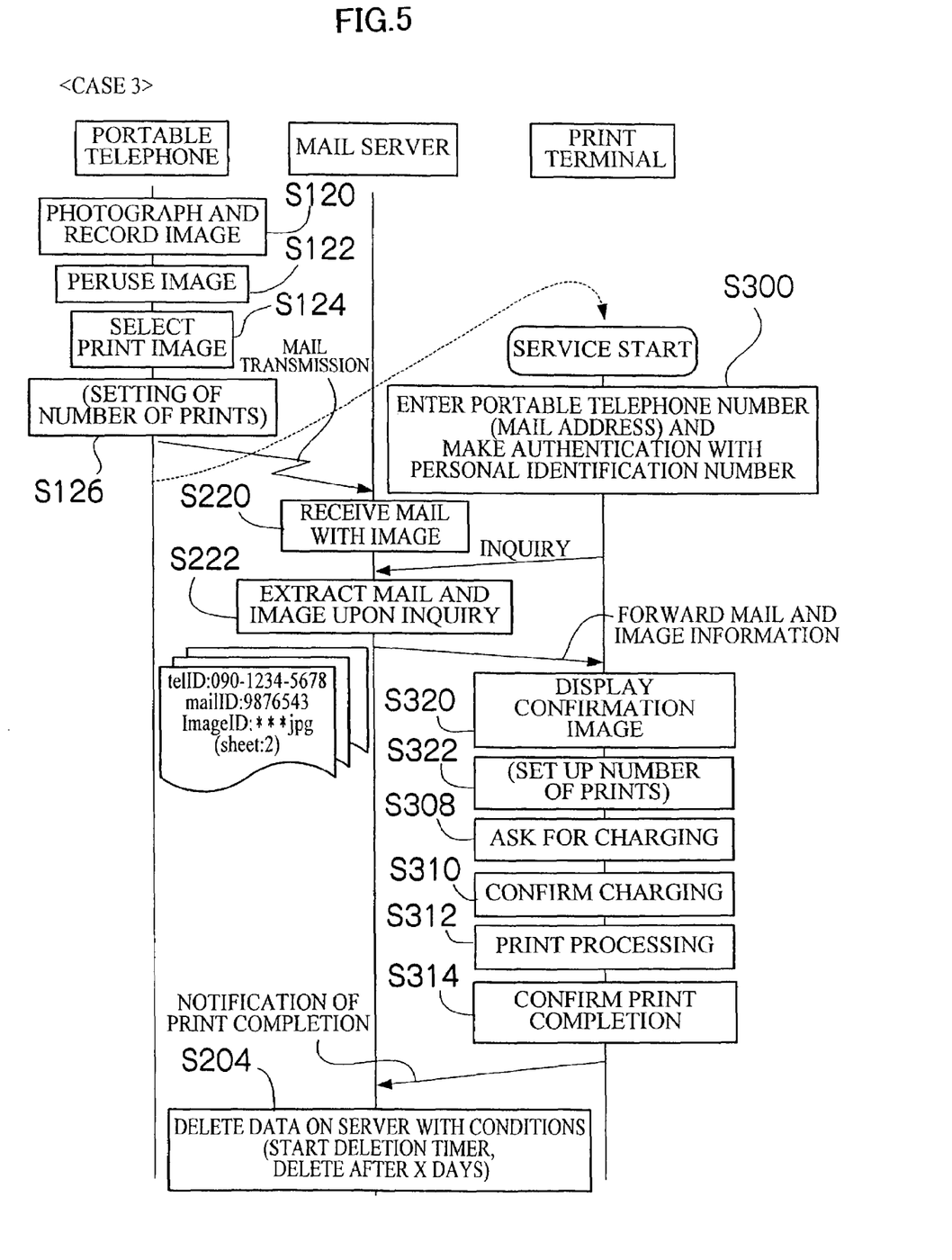
FIG. 5 is a flowchart showing a third embodiment of the operation of the image print system.

FIG. 5 is a flowchart showing a third embodiment of the operation of the image print system. The common steps to the first and second embodiments as shown in FIG. 3 are designated by the same step numbers, and the description of common steps is omitted.

In the third embodiment, an image photographed by the portable telephone with DSC of the user is printed on the print terminal apparatus 10.

In this case, the image photographed by the portable telephone with DSC is memorized in the memory within the portable telephone (step S120). To print the image memorized in the memory, the image is read and displayed on the monitor of the portable telephone (step S122). The user selects the image to be printed while viewing it on the monitor screen (step S124). Also, the number of prints is set up, as needed (step S126). The image displayed on the monitor is not limited to the image photographed by the portable telephone with DSC of the user, but may be the image received and memorized in the memory.

In this manner, after selecting the image to be printed and the number of prints (default number is one), the electronic mail with image is transmitted to the designated address (address of the print terminal apparatus 10 for performing the printing) from the portable telephone with DSC.

The mail server 30 receives the electronic mail with image, and stores the electronic mail with image to the mailbox for the print terminal apparatus 10 (step S220).

Thereafter, when the image of the electronic mail with image transmitted to the print terminal apparatus is printed, the user operates the touch panel of the print terminal apparatus 10 to enter the user identification information such as the portable telephone number (mail address) and personal identification number (step S300). And the print terminal apparatus 10 makes an inquiry of whether or not the electronic mail with image that the user transmits to the print terminal apparatus is stored in the mailbox via the communication line interface 108 to the mail server 30 on the basis of the user identification information entered.

The mail server 30 extracts the electronic mail with image transmitted from the user to the print terminal apparatus from the mailbox of the print terminal apparatus 10, on the basis of the user identification information, and transfers the extracted electronic mail with image to the print terminal apparatus 10 (step S222).

The print terminal apparatus 10 receives the electronic mail with image from the mail server 30, and displays the received image on the monitor with touch panel 106 for final confirmation (step S320). Then, the number of prints is set up or reset (step S322). And if a confirmation button is touched on the monitor with touch panel 106, the same processing as in the first embodiment of FIG. 3 is performed.

Figure 6A:
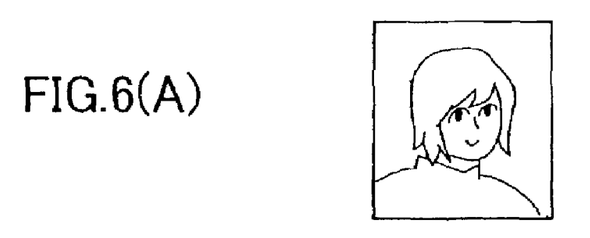
FIGS. 6(A), 6(B) and 6(C) are views showing examples of print images that are printed by the print terminal apparatus.
Figure 6B:
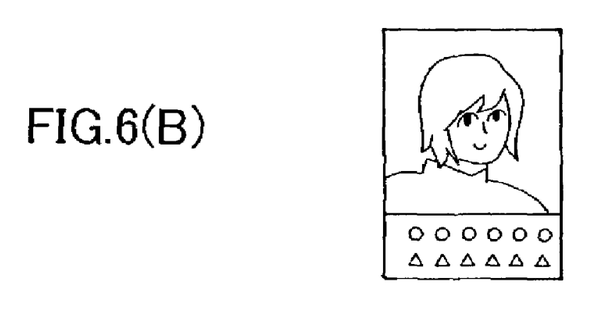
Figure 6C:
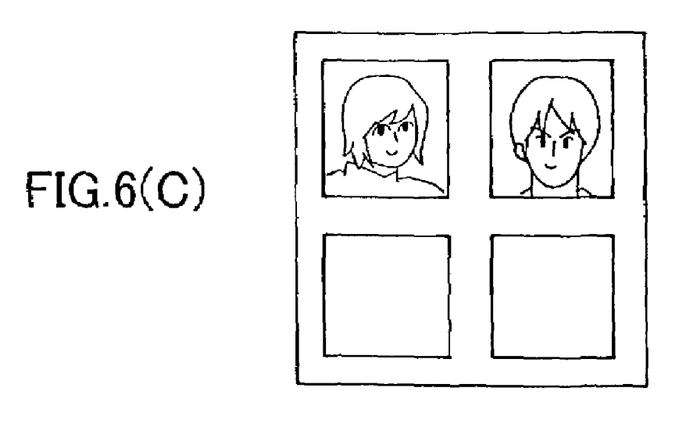

FIGS. 6(A), 6(B) and 6(C) show examples of print images to be printed by the print terminal apparatus 10.

FIG. 6(A) shows a normal print image of the image exchanged by the portable telephone with DSC.

FIG. 6(B) shows the print image of the image of the electronic mail with image having the characters of electronic mail. Namely, the image and the characters of the electronic mail can be printed by taking in the image and the character information of the electronic mail from the mail server 30. If there is a great number of characters for the electronic mail, the limited number of characters may be printed. The information (mail address) of the transmitter may be printed.

FIG. 6(C) shows a multi print where a plurality of selected images are printed on one print sheet.

The sort of prints may be selected on the screen for selecting the sort of print for the printer terminal. Also, the print charge per print is varied depending on the sort of prints, and imposed including the sort of prints.

In this embodiment, charging device is the payment of cash with the coin machine. However, the payment may be added to the telephone charge of the portable telephone, or made using a credit card or a prepaid card.

As above described, with this invention, the image exchanged via the electronic mail can be printed by the print terminal apparatus installed in a shop front. Particularly, since the image to be printed is retrieved from the mail server, there is no need of preparing personally the printer or the medium having the image recorded.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A print terminal apparatus, comprising:
   a communication device which communicates with a server, which stores an electronic mail with an image attached and which stores the electronic mail without the image attached;
   an input device which inputs the identification information of a user, and a selection of an image to be printed;
   an image retrieving device which retrieves only the electronic mail with the image attached from electronic mail, addressed to the user and stored on the server according to the identification information of the user, via the communication device on the basis of the identification information of the user input by the input device, and which retrieves the image attached to each of the retrieved electronic mail;
   a display device which displays the retrieved images as a list of the retrieved images; and
   a printing device which prints a selected image if a selection instruction for selecting the image to be printed from the list of images displayed on the display device is input by the input device.

2. The print terminal apparatus according to claim 1, further comprising a billing device which bills a print output by the printing device.

3. The print terminal apparatus of claim 1, wherein the display device displays a list of messages with images attached associated with the user.

4. The print terminal apparatus of claim 3, wherein the displayed messages are based on at least one of a tag and an extension, said at least one of the tag and the extension indicating that an image is attached to the message.

5. The print terminal apparatus of claim 3, wherein the messages are based on at least a tag indicating the presence of the image to the message and the tag is not displayed.

6. The print terminal apparatus of claim 1, wherein the deletion of message occurs after printing.

7. The print terminal apparatus of claim 6, wherein the deletion is based on a starting of a timer after print.

8. The print terminal apparatus of claim 1, wherein the print selection is from those messages have a print tag.

9. The print terminal apparatus of claim 1, wherein the printing device prints characters of the electronic mail along with the image.

10. A print terminal apparatus, comprising:
- a communication device which communicates with a server, which stores an electronic mail with an image attached with a print request flag that is set, an electronic mail with the image attached with a print request flag that is not set, and an electronic mail without the image attached;
- an input device which inputs the identification information of a user;
- an image retrieving device which retrieves only the electronic mail with the image attached with the print request flag that is set from among electronic mails addressed to said user, which are stored on the server according to identification information of a user and a print request flag, from the server via the communication device on the basis of the identification information of the user input by the input device, and which retrieves the image attached to each of the retrieved electronic mail; and
- a printing device which prints the retrieved image,
- wherein the print terminal apparatus displays the retrieved images, and
- wherein the user selects an image to be printed from the retrieved images.

11. The print terminal apparatus according to claim 10, further comprising a billing device which bills a print output by the printing device.

12. A print terminal apparatus, comprising:
- a communication device which communicates with a server, which stores electronic mail with an image attached that is sent to a predetermined address of the print terminal apparatus;
- an input device which inputs the identification information of a user;
- an image retrieving device which retrieves the image attached to each of the electronic mail which the user transmits to the predetermined address of the print terminal apparatus via the communication device from the server on the basis of the identification information of the user input by the input device and the predetermined address of the print terminal apparatus;
- a display device which displays the retrieved images, wherein the user selects an image to be printed from the retrieved images; and
- a printing device which prints the selected image,
- wherein the image retrieving device retrieves only electronic mail having an image attached.

13. The print terminal apparatus according to claim 12, further comprising a billing device which bills a print output by the printing device.

14. The print terminal apparatus according to claim 12, wherein the printing device prints characters of the electronic mail along with the image.

15. An image print system, comprising:
- a mail server with a device storing an electronic mail with an image attached with a print request flag that is set, an electronic mail with the image attached and with a print request flag that is not set, and an electronic mail without the image attached, and a device setting a print request flag in regard to the electronic mail with an image attached; and
- a print terminal apparatus with a communication device communicating with the mail server, input device for inputting identification information of the user, and a printing device, wherein:
- the print terminal apparatus transmits the identification information of the user input by the input device to the mail server;
- the mail server retrieves only the electronic mail with the image attached with the print request flag that is set from among electronic emails addressed to said user, which are stored in the server according to identification information of a user and a print request flag, on the basis of the identification information of the user received from the print terminal apparatus, and transmits the retrieved electronic mail with an image aft ached to the print terminal apparatus;
- the print terminal apparatus displays the image attached to each of the received electronic mail and prints the image attached to each of the received electronic mail.

16. The print terminal apparatus of claim 15, wherein the display device displays a list of messages with images attached associated with the user.

17. The print terminal apparatus of claim 15, wherein the displayed messages are based on at least one of a tag and an extension, said at least one of the tag and the extension that an image is attached to the message.

18. The print terminal apparatus of claim 15, wherein the print selection is from those messages have a print tag.

19. An image print system, comprising:
- a mail server with a device storing an electronic mail with an image attached that is sent to a predetermined address a print terminal apparatus; and
- a terminal device with a communication device communicating with the mail server, an input device for inputting identification information of the user, and a printing device, wherein:
- the print terminal apparatus transmits the identification information of the user input by the input device to the mail server;
- the mail server retrieves an electronic mail with an image attached transmitted from said user to the predetermined address of the print terminal apparatus on the basis of the identification information of the user received from the print terminal apparatus, and transmits the retrieved electronic mail with an image attached to the print terminal apparatus; and,
- the print terminal apparatus prints the image attached to an electronic mail received from the mail server with the printing device;
- a display device which displays the retrieved images, wherein the user selects an image to be printed from the retrieved images; and
- wherein the user selects an image to be printed from the retrieved images, and
- wherein the mail server retrieves only electronic mail having an image attached.

20. The image print system according to claim 19, wherein the printing device prints characters of the electronic mail along with the image.

* * * * *